United States Patent [19]
Kijima et al.

[11] 3,719,690
[45] March 6, 1973

[54] BASIC AMINO-ACID SALTS OF TOCOPHERYLSUCCINATE

[75] Inventors: Shizumasa Kijima; Norio Minami, both of Tokyo, Japan

[73] Assignee: Eisai Co. Ltd., Tokyo, Japan

[22] Filed: Nov. 5, 1970

[21] Appl. No.: 87,304

[30] Foreign Application Priority Data

Nov. 13, 1969 Japan ................................44/90479

[52] U.S. Cl. ...............................260/345.5, 424/284
[51] Int. Cl. ................................................C07d 7/22
[58] Field of Search.....................................260/345.5

[56] References Cited

UNITED STATES PATENTS 3,538,119  11/1970  Grant ................................260/345.5
3,551,457  12/1970  Ross ..................................260/345.5

*Primary Examiner*—John M. Ford
*Attorney*—Woodhams, Blanchard and Flynn

[57] ABSTRACT

Water-soluble basic amino-acid salts of tocopherylsuccinate are prepared by reacting tocopherylsuccinate with the basic amino-acid, such as arginine, lysine and ornithine.

6 Claims, No Drawings

BASIC AMINO-ACID SALTS OF TOCOPHERYLSUCCINATE

BACKGROUND OF THE INVENTION

1. Field of the Invention

This invention relates to water-soluble basis amino-acid salts of tocopherylsuccinate and a method of making same.

2. Description of the Prior Art

Tocopherols are known to have various physiological activities and antioxidative activity in living bodies. They activate the pituitary and adrenal glands and promote the well-balanced secretion of their hormones. They improve the circulation of blood and help the distribution of various nutrients and fresh oxygen throughout the body. Further they affect the functioning of the automatic nervous system regulating the blood vessels, locomotive organs, sensory system, digestive system etc., and they also activate the sexual function, promote spermatogenesis and increase the motility of sperms. Therefore, they have recently been used not only in pharmaceuticals for humans and animals, but also in various food stuffs and animal feeds, and further applications of them are now being developed.

It is well known that tocopherols are lipid soluble only substances and they are not soluble in water. Lipid soluble substances are generally less absorbed in living bodies than water soluble substances. Thus, many efforts have been made to effect water solubilization of these tocopherols.

The water soluble derivatives of tocopherols hitherto known include the following; polyethyleneglycol-$\alpha$-tocopherylphosphate produced by the reaction of tocopheryldihalogenophosphate with polyethyleneglycol (Japanese Pat. Publication No. 35/1958), tocopherylpolyoxyalkyleneether produced by the reaction of tocopherol with alkyleneoxide (Japanese Pat. Publication No. 1218/1958), tocopherylpolyethyleneglycolsuccinate through the reaction of tocopherylsuccinate with polyethyleneglycol (U.S. Pat. No. 2 680 749). However, in the above compounds, the ratio of the tocopherol component to the non-tocopherol component is low. Moreover, the production of these compounds requires complicated processes and long times.

SUMMARY OF THE INVENTION

We now have discovered new basic amino-acid addition salts of tocopherylsuccinate which are easily soluble in water. These new basic amino-acid salts of tocopherylsuccinate can be produced by reacting tocopherylsuccinate with basic amino-acids, which not only are non-toxic but also have nutrient value themselves.

One hundred milligrams of L-lysine salt, L-ornithine salt or L-arginine salt of dl-$\alpha$-tocopherylsuccinate, or L-lysine salt, L-ornithine salt or L-arginine salt of d-$\alpha$-tocopherylsuccinate, which have been obtained according to the present invention, dissolve opalescently in 1 ml of water, respectively. It has been observed that these aqueous salt solutions remain unchanged after storage for 2 months under room temperature.

In the basic amino acid salts of tocopherylsuccinate obtained according to the present invention, the weight ratio of tocopherylsuccinate to the basic amino acid is, for example, 100:27.5 for the lysine salt, 100:32.8 for the arginine salt and 100:24.9 for the ornithine salt. It can be easily understood from the above that the basic amino acid salts of tocopherylsuccinate according to the present invention have higher contents of the tocopherol moiety as compared with the hitherto known water-soluble tocopherol derivatives. The tocopherol derivatives according to the present invention can be injected intramuscularly as an injectable solution which is prepared by dissolving 100 to 150 milligrams of said derivative in 2 ml of a saline solution. Compositions containing the tocopherol derivative according to the present invention can take the form of other aqueous solutions, tablets, or other type of medicaments.

In producing the above tocopherol derivatives according to the present invention, any type of tocopherols, for example, the d-form and the dl-form of $\alpha$-, $\beta$-, $\gamma$-, and $\delta$- tocopherols can be used. Also, any of the known basic amino acids can be utilized in the present invention. Both natural and synthetic basic amino acids can be suitably used. For example, L-arginine, L-lysine, L-ornithine, their optical isomers and their racemic form can be advantageously used.

The reaction of tocopherylsuccinate with the basic amino-acid according to the present invention is carried out by dissolving tocopherylsuccinate in a lower alcohol, such as methyl alcohol or ethyl alcohol, and adding thereto an aqueous solution of the basic amino-acid. The reaction requires usually from 30 minutes to 2 hours under the refluxing temperature of the reaction mixture. After the reaction is completed, the product can be isolated through conventional isolation procedures such as filtration or removal of solvent. If necessary, the recrystallization of the product is carried out from a solvent such as methyl alcohol or ethyl alcohol.

The new basic amino-acid salts of tocopherylsuccinate according to the present invention completely retain the vitamin E activity which has been confirmed by the hemolysis test on rats induced by dialuric acid.

Further, the acute toxicity of the novel compounds according to the present invention is indicated by the following experiment.

As the experimental animals, male Wister rats (1.5 months old; 140–160g of body weight) and male DDN mice (1.0 month old; 12–16g of body weight) were used in groups, each group consisting of 10 animals, and as large an amount as possible for each animal (rat 4g/kg: mouse 8g/kg) of a water solution (0.4g/1 ml) of L-lysine salt, L-ornithine salt or L-arginine salt of dl-$\alpha$-tocopherylsuccinate was orally administered. No death of any animal was observed in this experiment and autopsy showed no histological change.

The above mentioned results show that the compounds according to the present invention are substantially non-toxic.

DESCRIPTION OF THE PREFERRED EMBODIMENTS

The production of the compounds according to the present invention is illustrated by the following illustrative and non-limiting examples.

EXAMPLE 1

Twelve grams of d-α-tocopherylsuccinate were dissolved in 150 ml of methyl alcohol. To this solution, 2.6 g of L-ornithine dissolved in 15 ml of water was added. The mixture was heated to reflux for 1 hour. Then, the mixture was cooled and the resulting precipitant was filtered to obtain 11.7 g of crude L-ornithine salt of d-α-tocopherylsuccinate as a white powder. The pure salt (M.P. 145° – 146°C.) was obtained by recrystallizing the above crude salt from methyl alcohol. 100 milligrams of the L-ornithine salt can be dissolved in 1 ml of distilled water.

Analysis - $C_{38}H_{66}O_7N_2$ (M.W. 662.96)

|  | C | H | N |
|---|---|---|---|
| Calculated | 68.84% | 10.03% | 4.23% |
| Found | 68.75% | 9.96% | 4.05% |

EXAMPLE 2

The procedure of Example 1 was carried out except that there was used 12.0 g of dl-α-tocopherylsuccinate dissolved in 150 ml of methyl alcohol and the reflux time was ½ hour. 11.2 g of L-ornithine salt of dl-α-tocopherylsuccinate was thus obtained as a white powder. After recrystallization from methyl alcohol the melting point of the purified salt was 142° – 144°C. One hundred milligrams of the L-ornithine salt can be dissolved in 1 ml of distilled water.

Analysis - $C_{38}H_{66}O_7N_2$ (M.W. 662.96)

|  | C | H | N |
|---|---|---|---|
| Calculated | 68.84% | 10.03% | 4.23% |
| Found | 68.95% | 10.10% | 4.07% |

EXAMPLE 3

To 12 g of d-α-tocopherylsuccinate dissolved in 150 ml of methyl alcohol, was added 3.5 g of L-arginine dissolved in 15 ml of water and the mixture was refluxed for 2 hours. The reaction mixture was then distilled under a reduced pressure to remove the solvent. The residual water was then removed by an azeotropic distillation with ethyl alcohol.

15.4 g of crude L-arginine salt of d-α-tocopherylsuccinate was obtained as a pale yellow wax. After two recrystallizations from methyl alcohol, the purified L-arginine salt of d-α-tocopherylsuccinate was obtained as pale yellow powder. M.P.: 139° – 140°C.

One hundred milligrams of the L-arginine salt can be dissolved in 1 ml of distilled water.

Analysis - $C_{39}H_{68}O_7N_4$ (M.W. 705.00)

|  | C | H | N |
|---|---|---|---|
| Calculated | 66.44% | 9.72% | 7.95% |
| Found | 66.31% | 9.95% | 7.68% |

EXAMPLE 4

The procedure of Example 3 was carried out except that there was used 12 g of dl-α-tocopherylsuccinate and 3.5 g of L-arginine dissolved in 15 ml of water. 12.9 g of crude L-arginine salt of dl-α-tocopherylsuccinate was thus obtained as a pale yellow wax. After repeated recrystallizations from methyl alcohol, a purified L-arginine salt of dl-α-tocopherylsuccinate was obtained as a white powder. M.P.: 135° – 136°C.

One hundred milligrams of the L-arginine salt can be dissolved in 1 ml of distilled water.

Analysis - $C_{39}H_{68}O_7N_4$ (M.W. 705.00)

|  | C | H | N |
|---|---|---|---|
| Calculated | 66.44% | 9.72% | 7.95% |
| Found | 66.21% | 9.95% | 7.87% |

EXAMPLE 5

The procedure of Example 3 was carried out except that there was used 2.9 g of L-lysine dissolved in 15 ml of water. 14.8 g of L-lysine salt of d-α-tocopherylsuccinate was thus obtained as a pale yellow wax. After three crystallizations from methyl alcohol, purified L-lysine salt of d-α-tocopherylsuccinate was obtained. M.P.: 139° – 141°C.

One hundred milligrams of the L-lysine salt can be dissolved in 1 ml of distilled water.

Analysis - $C_{39}H_{68}O_7N_2$ (M.W. 676.99)

|  | C | H | N |
|---|---|---|---|
| Calculated | 69.19% | 10.12% | 4.14% |
| Found | 69.25% | 10.34% | 4.00% |

What we claim is:

1. A compound selected from the group consisting of the arginine, lysine and ornithine salts of tocopherylsuccinate.
2. The compound as claimed in claim 1, consisting of the L-ornithine salt of d-α-tocopherylsuccinate.
3. The compound as claimed in claim 1, consisting of the L-ornithine salt of dl-α-tocopherylsuccinate.
4. The compound as claimed in claim 1, consisting of the L-arginine salt of d-α-tocopherylsuccinate.
5. The compound as claimed in claim 1, consisting of the L-arginine salt of dl-α-tocopherylsuccinate.
6. The compound as claimed in claim 1, consisting of the L-lysine salt of d-α-tocopherylsuccinate.

* * * * *